United States Patent [19]
Yuno

[11] Patent Number: 5,109,355
[45] Date of Patent: Apr. 28, 1992

[54] DATA INPUT APPARATUS HAVING PROGRAMMABLE KEY ARRANGEMENT

[75] Inventor: Tatsuhiko Yuno, Yokohama, Japan

[73] Assignee: Canon Kabushiki Kaisha, Tokyo, Japan

[21] Appl. No.: 506,930

[22] Filed: Apr. 10, 1990

[30] Foreign Application Priority Data

Apr. 11, 1989 [JP] Japan .................................. 1-89669

[51] Int. Cl.$^5$ .............................................. G06F 3/00
[52] U.S. Cl. .............................................. 364/709.12
[58] Field of Search ................... 364/709.01, 709.12, 364/709.14, 709.15, 709.16; 341/23

[56] References Cited

U.S. PATENT DOCUMENTS

| | | | |
|---|---|---|---|
| 4,498,149 | 2/1985 | Yoshida ........................ | 364/709.12 |
| 4,688,020 | 8/1987 | Kuehneman et al. ............. | 341/23 |
| 4,823,311 | 4/1989 | Hunter et al. .................. | 364/709.14 |
| 4,853,888 | 8/1989 | Lata et al. ..................... | 341/23 |

*Primary Examiner*—Gary V. Harkcom
*Assistant Examiner*—Long T. Nguyen
*Attorney, Agent, or Firm*—Fitzpatrick, Cella, Harper & Scinto

[57] ABSTRACT

A data input apparatus having a keyboard with a plurality of character keys and a memory for storing first, second and third control tables. The first control table contains a first key arrangement with an internal code train that is input by depressing a corresponding key on the keyboard, the second control table contains a second key arrangement with a logic structure different from the first control table and stored in a rewritable memory, and the third control table identifies which of the keys of the keyboard in the second key arrangement are assigned to corresponding to the internal code train input by depressing a corresponding key. Data in the second control table corresponding to the internal code train in the third control table can be edited and one of the first and second control tables in the memory can be selected for performing key input data conversion. Therefore, a predetermined key arrangement can be given to the keyboard by storing and editing the key arrangement of the keyboard in the second control table, so that if the first control table is selected the key arrangement stored in the first control table is used, and if the second control table is selected a different key arrangement can be used.

14 Claims, 6 Drawing Sheets

DATA INPUT APPARATUS HAVING PROGRAMMABLE KEY ARRANGEMENT

BACKGROUND OF THE INVENTION

1. Field of the Invention

The present invention relates to a data input apparatus and, more particularly, to a data input apparatus having a keyboard comprising a plurality of character keys, wherein a first control table in which an internal code train that is input by depressing a key of the keyboard is made to correspond with respect to each of the keys of the keyboard is provided in an unrewritable memory. A predetermined key arrangement is given to the keyboard by selecting the table, and a rewritable second control table is provided having another logic structure different from the first control table and a third control table is provided in which each key in the second control table and an internal code train are made to correspond. In addition, another key arrangement different from the key arrangement of the keyboard by the first control table is given.

2. Description of the Related Background Art

Ordinarily, in an electronic apparatus such as an electronic typewriter, word processor, personal computer, or the like, a keyboard (what is called a full keyboard) on which a number of key switches are arranged is used as means for inputting the operation.

As a key arrangement of the keyboard which is used in such a kind of apparatus, the following key arrangements are known.

1) A key arrangement which has been standardized in every country such as in an electronic typewriter for use in offices;

2) A key arrangement which has been integrated and has been put into custom-made use in every district such as in an electronic typewriter for personal use; and 3) A unique key arrangement that is peculiar to each manufacturer.

The keyboard can be unconsciously operated by an operator if he is familiar with the key operation to a certain extent In many cases, a type of keyboard which is operated by both hands is operated by the blind touch manner. Therefore, as the operability of the keyboard is improved, the keys to be operated become less conscious.

The above three key arrangements will now be considered. In the case of the key arrangement which has been standardized in every country or has been put into custom-made use as in the above items 1) and 2), even if the operator moved from a certain apparatus to another apparatus, he can also operate the keyboard of another apparatus in a manner similar to the former apparatus However, in the case of the key arrangement that is not standardized and integrated as in item 3), after the operator is familiar with a certain key arrangement, if he moves to operate an input system having another key arrangement of a different apparatus, it is troublesome for the operator to newly learn the operations of the new system and it also takes a long time.

On the other hand, in recent years, the performance has become higher and higher and the costs have decreased lower and lower in association with the model changes of electronic apparatuses. A product having functions more than those in the previous model is put on sale at the same price in a short period of time. Even in the case of the same functions, the price extremely decreases.

In the case of changing the model as mentioned above, for a keyboard having a key arrangement which is not standardized and is not put into custom-made use such as in, for instance a personal electronic typewriter or the like, the key arrangement of the new product is frequently different from that of the old product.

Although the user can obtain various benefits such as low price, high function, and the like of the new product by buying the new product in place of the old product, the user must learn the key operations to execute the new functions and must learn the troublesome operations until he learns the key positions which are quite different from those of the old product.

However, in spite of such a drawback, it is not always necessary to completely fix the key arrangement on the basis of a certain standard. This is because, there is a limitation when the functions of a keyboard having a key arrangement that was limited to a certain standard are expanded by using an expansion key sequence such as a shift key sequence, control key sequence, escape key sequence, or the like and, on the other hand, there is also a case where the operability contrarily deteriorates due to the expansion as mentioned above.

On the other hand, in a conventional keyboard system, the physical specifications such as key arrangement, number of keys, or the like of the keyboard are fixed. There are also problems such that even if the user doesn't like the key arrangement and the number of keys of the apparatus that he bought, it is almost impossible to change them, and even if it is difficult to use the apparatus, he must use it in accordance with the specifications of the apparatus.

SUMMARY OF THE INVENTION

It is an object of the present invention to enable the user to set a desired key arrangement by himself.

Another object of the invention is that a first control table containing an internal code train that are input by depressing a corresponding key is provided in an unrewritable memory, in addition to the first control table, a second control table having the same structure is provided in a rewritable memory, such that a key arrangement of the keyboard can be set and changed to a desired key arrangement by changing the content of the second control table.

Still another object of the invention is that by selecting either one of the second and third control tables, a custom-made key arrangement or a standardized key arrangement can be easily selected.

DETAILED DESCRIPTION OF THE PREFERRED EMBODIMENTS

The present invention will be described in detail hereinbelow on the basis of an embodiment shown in the drawings.

Figure 1:
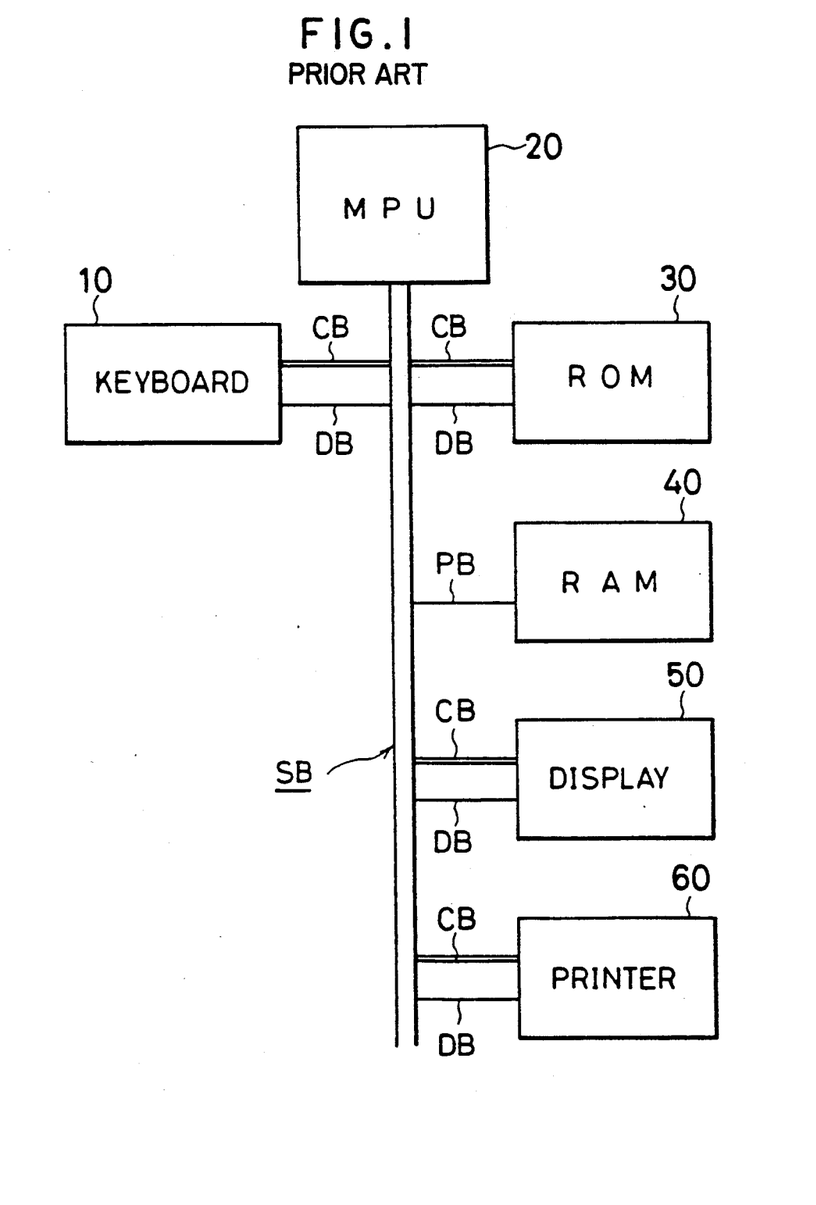
FIG. 1 is a block diagram showing a control system of a data input apparatus according to the present invention.
Figure 2:
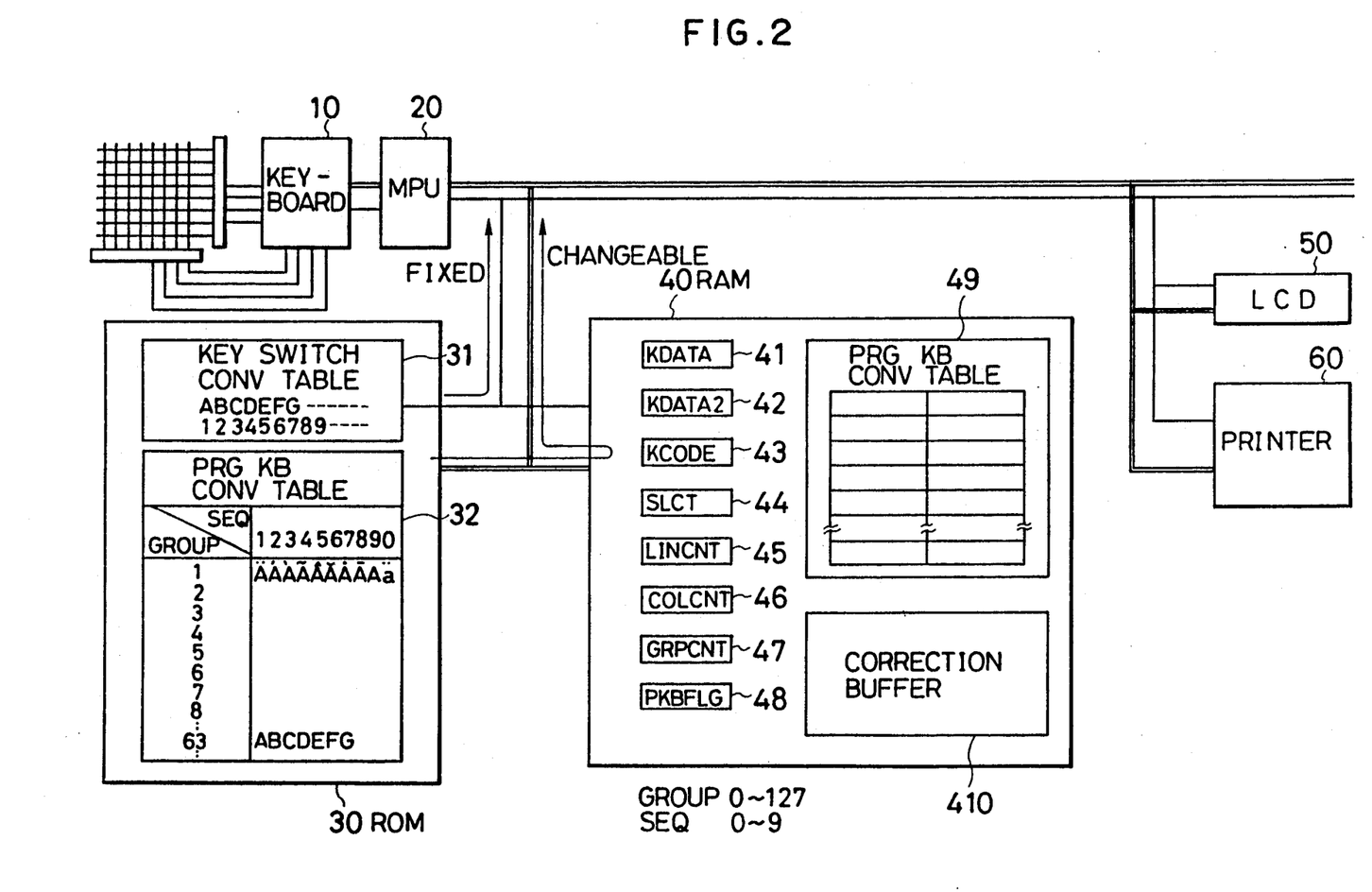
FIG. 2 is a block diagram showing in more detail a construction of FIG. 1.

FIGS. 1 and 2 show the first embodiment of the invention.

FIG. 1 shows a construction of a control system which is common in an electronic typewriter, a word processor, or the like to which the invention is applied.

In FIG. 1, reference numeral 10 denotes a keyboard as input means for inputting characters, symbols, control keys, and the like. Reference numeral 20 indicates a microprocessor (hereinafter, referred to as an MPU) to control an input/output section, data, and the like in accordance with the processing procedures.

Figure 3A:
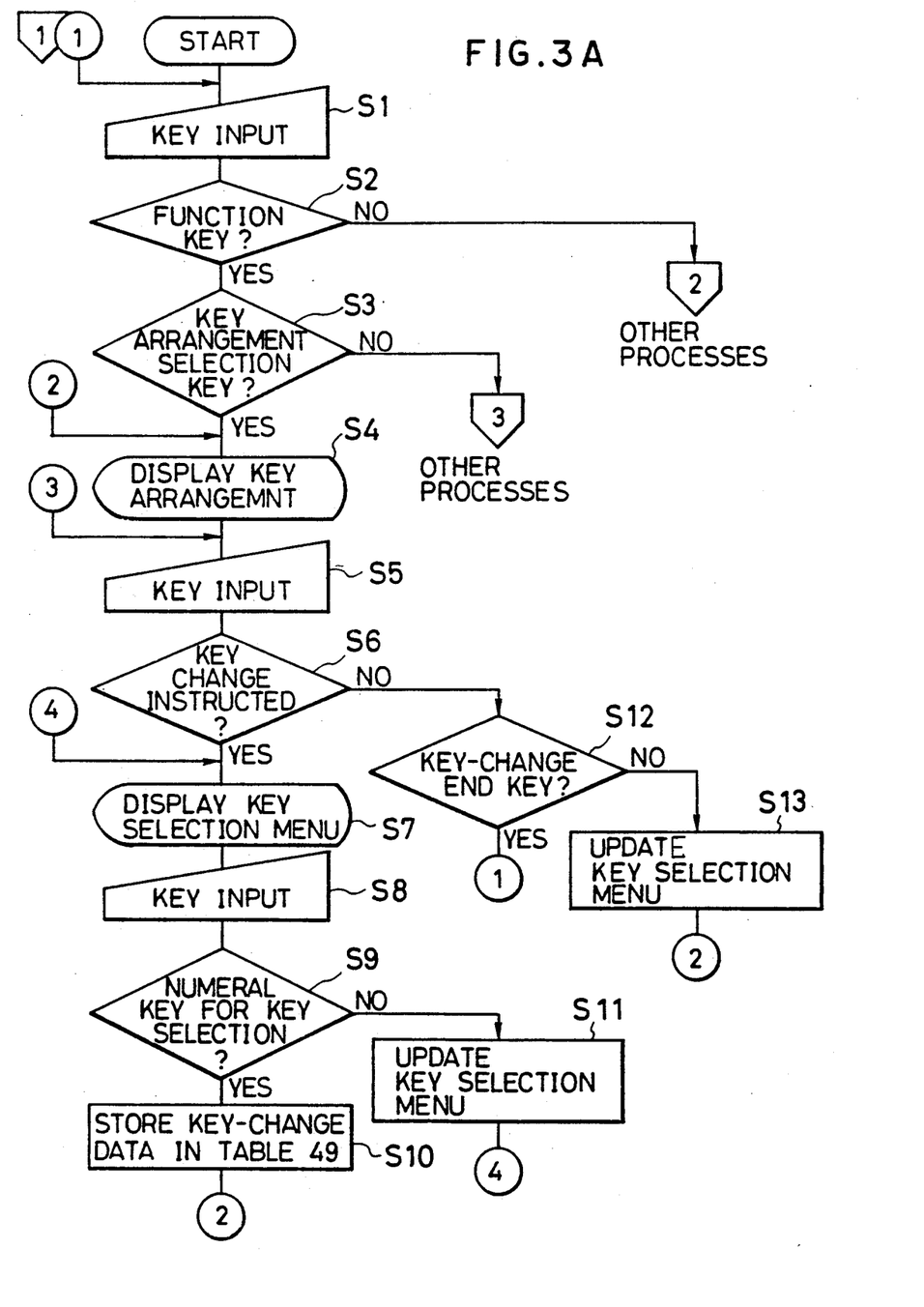
FIGS. 3A, 3B, 3C are flowcharts showing control procedures of an MPU in FIG. 1.
Figure 3B:
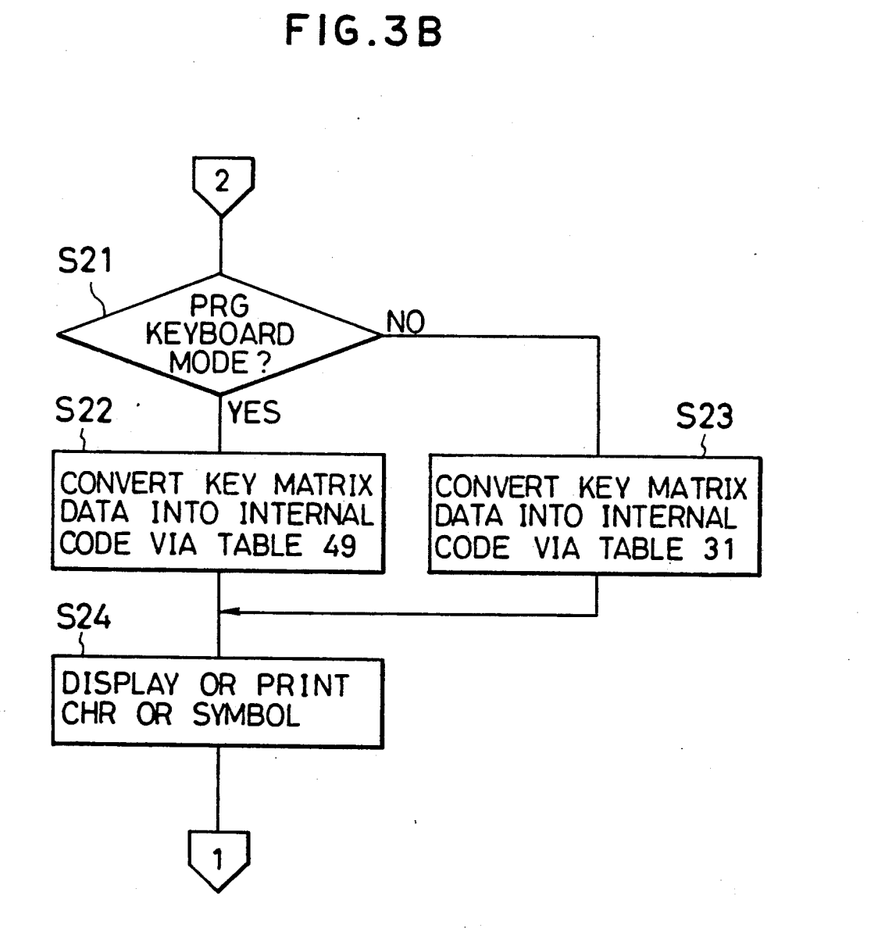
Figure 3C:
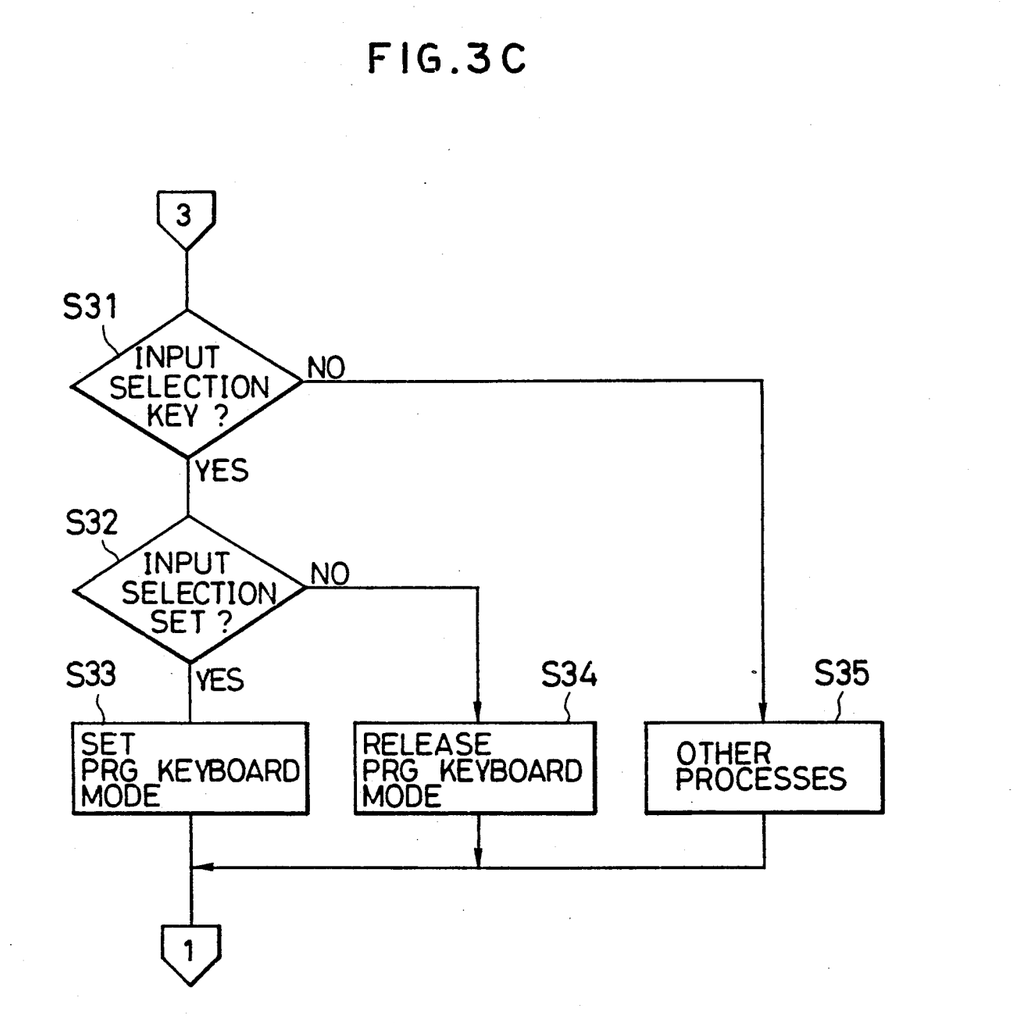

Reference numeral 30 denotes a ROM in which not only processing procedures shown in FIGS. 3A to 3C but also various control procedures which are executed by the MPU 20 and control data are stored. Reference numeral 40 indicates a RAM to store the control data of various control procedures of the MPU 20 as well as the processing procedures of FIGS. 3A to 3C, document data, and the like. Reference numeral 50 denotes a display comprising an LCD panel or the like to display characters, symbols, and the like and 60 indicates a printer to print characters, symbols, and the like.

The above components are coupled by a data bus DB and a control bus CB which are included in a system bus SB of the MPU 20. The MPU 20 controls the data input/output operations for the other components.

In the embodiment, key matrix data corresponding to the operation of the keyboard 10 is input from the keyboard 10 to the MPU 20. In accordance with the control, which will be explained below, the MPU 20 can change the assignment of the character code or control code stored in the memory in correspondence to the input from the keyboard 10. Thus, the assignment (key assignment) of the functions of the keys of the keyboard 10 can be changed.

Information to change the key assingnment is stored in the ROM 30 and RAM 40.

FIG. 2 shows a construction of FIG. 1 in more detail. Memory structures of the ROM 30 and RAM 40 are shown in detail here.

In FIG. 2, table areas 31 and 32 set in the ROM 30 denote key code conversion tables to convert the matrix data of the keys which are input from the keyboard 10 into the internal codes of characters, symbols, or the like.

First, the key switch conversion table 31 (first control table) is a key code conversion table in which various kinds of key arrangements based on the industrial standard or the like of each country which can be selected in accordance with the physical specifications of key switches arranged on the keyboard 10 are stored. The input of the table relates to matrix data which is input from the keyboard 10. The output of the table is a key code indicative of the depression of a predetermined physical key. One of the key arrangements in the table is selected by the data stored in table selection data 44 in the RAM 40.

The program keyboard conversion table 32 (third control table) is a table to convert the group numbers and sequence numbers corresponding to a program keyboard conversion table 49 (second control table) into character codes and internal codes comprising various control codes. The table 32 comprises a plurality of groups (1 to n) corresponding to the program keyboard conversion table 49 which can be set by the user as mentioned above. The character codes which can be expressed by the internal codes, overlap characters (accent+character codes), and various control codes are arranged in accordance with the order of the group sequences (1 to 10). Those groups are sequentially arranged in accordance with the order of addresses.

In addition, the following areas are set in the RAM 40.

First, key matrix data (0 to 3F) which were input from the keyboard 10 by the control of the MPU 20 are stored into a key data area 41.

Decoration data (code, mode, shift) and the like as additional data of the keys stored in the key data area 41 are stored into an area 42.

In an area 43, there are stored final internal key codes which were converted by the key data in the key data areas 41 and 42, the key code conversion data in the key switch conversion table 31 and program keyboard conversion table 32, and the data in the table selection data 44, an area 48, and program keyboard conversion table 49, which will be explained below. The key codes in the area 43 are stored as input data into a correction buffer 410 for edition.

The data per country which is set when a power supply is turned on is stored into the table selection data 44 and is referred to when the key arrangement in the key switch conversion table 31 is selected.

The second table selection flag 48 indicates whether the program keyboard control, that is, the key assignment definition by the user using the program keyboard conversion table 49, is executed or not. The flag 48 is controlled in accordance with a predetermined function key input.

Reference numerals 45 to 47 denote key arrangement and key selection data of the keyboard when the program keyboard control is set. Column data (upper stage, lower stage 0 to 7) of change keys on the keyboard is stored into the line counter 45. A lateral position (left to right: 0 to 11) is stored into the column counter 46. A group number of the program keyboard conversion table 32 which is currently selected is stored into the area 47.

The program keyboard conversion table 49 is a key conversion table which is used in the program keyboard control mode and has a structure corresponding to the program keyboard conversion table 32. Although the key assignment in the key switch conversion table 31 is fixedly used in a mode other than the program keyboard control mode, the program keyboard conversion table 49 and program keyboard conversion table 32 are used in place of the key switch conversion table 31 in the program keyboard control mode. In the initialization mode, the group number and sequence number in the program keyboard conversion table 32 corresponding to predetermined key conversion data in the key switch conversion table 31 which was selected by the table selection data 44 are stored as initial values into the program keyboard conversion table 49.

After that, the user changes the data in the program keyboard conversion table 49 by the operation, which will be explained hereinlater, so that he can change the key assignment for the keys. As shown in the diagram, the program keyboard conversion table 49 corresponds to the key switches arranged on the keyboard 10. The group numbers in the program keyboard conversion table 49 correspond to the groups of the program keyboard conversion table 32. The sequence numbers correspond to the table sequences of the program keyboard conversion table 32.

Reference numeral 410 in the RAM 40 denotes the correction buffer to store and edit the internal codes obtained by using the foregoing areas as document data and the like.

FIGS. 3A to 3C show examples of processing procedures for executing the programmable key input by arrangement selecting means of the key switches of the program keyboard regarding the embodiment, selection changing means of the key switch data, means for storing the key switch data corresponding to the key switches, and instruction setting means of the program keyboard.

Figure 4A:
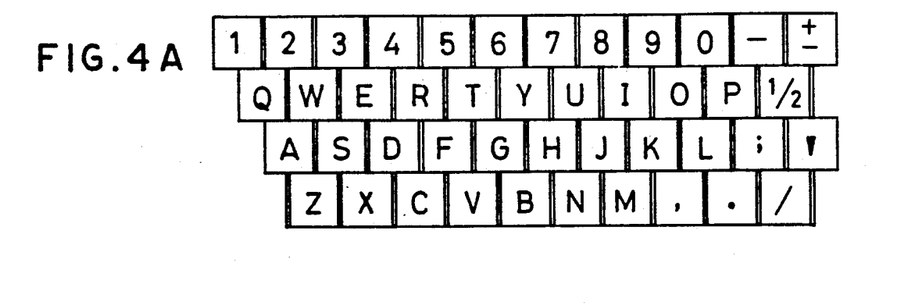
FIGS. 4A, 4B, 4C, 4D, 4E are explanatory diagrams showing setting and changing states of a program keyboard in an embodiment of the present invention and display states in such cases.

It is assumed that the key switch arrangement upon shipping of the keyboard 10 has previously been constructed as shown in FIG. 4A.

First, in step S1 in FIG. 3A, when a key input is executed from the keyboard 10, step S2 follows and a check is made to see if the input key is a function key or not.

If YES in step S2, step S3 follows and a check is made to see if the function key is a key switch arrangement selection function key of the program keyboard or not.

Figure 4B:
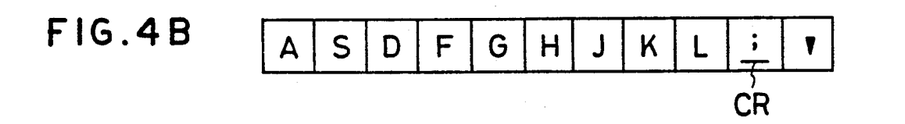

If YES in step S3, step S4 follows and the key switch arrangement selection menu selected by the program keyboard is displayed by the display 50 with reference to the line counters 45 to 47 and the program keyboard conversion table 32. FIG. 4B shows an example of a menu display format.

The characters assigned to the keys at the middle stage of the keyboard 10 are shown in FIG. 4B. Such a display is used as a menu for the programming of the keyboard. A cursor CR is also simultaneously displayed. The cursor CR is moved to the position of the key in which a change is desired and a predetermined key, such as a return key or the like, of the keyboard 10 is depressed, so that a key assignment change for the key is started.

Further, in step S5, the key switch arrangement selection key or key switch change selection key is input from the keyboard 10. If the key input is executed from the keyboard 10 in step S5, step S6 follows and a check is made to see if the key input data instructs, for instance, the change selection key (shown as an example in the above) or not.

If YES in step S6, step S7 follows and a change selection menu of the key switch is displayed by the display 50. The display format is shown in FIG. 4C.

Figure 4C:
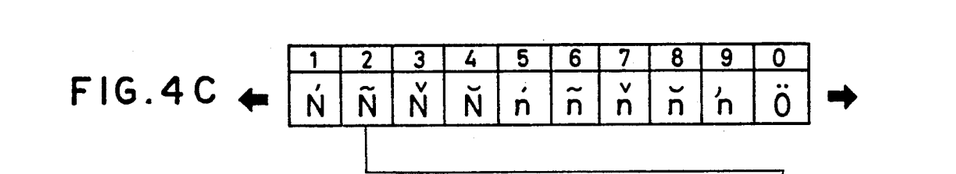

In FIG. 4B, assuming that the key ";" has been selected, in FIG. 4C, (ten kinds of) characters N with various kinds of accent symbols are displayed as candidates for the characters that can be assigned to the key ";". Arrows←and→shown in FIG. 4C denote that more candidates can be referred by a predetermined key, for instance, an update key in the function keys.

The candidates displayed are instructed by inputting a numeral shown in the upper stage in FIG. 4C from the keyboard 10

The input of the above update key (←, →, or any character key such as a, z, or the like can also be used) or the numeral key ("1" to "0") is detected in step S8.

If the key input has been executed in step S8, step S9 follows and a check is made to see if the input key is a numeral key ("1" to "0") to select a key switch or not.

If the input key is the key switch selection key in step S9, step S10 follows and the content (key switch data corresponding to the group number and sequence number of the program keyboard conversion table 32) of the relevant area in the program keyboard conversion table 49 of the key switch data corresponding to the key data (either character corresponding to the depressed numeral key in FIG. 4C) which was selected by the counters 45 and 46 is changed. Then, the processing routine advances to step S4.

Figure 4D:
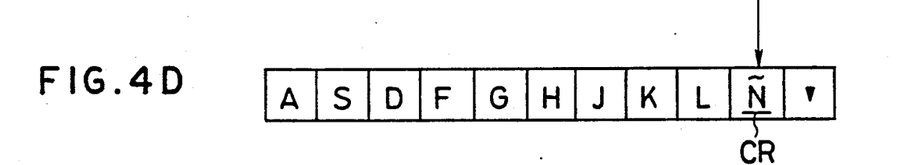

In step S4, the key assignment after the change as shown in FIG. 4D is displayed in a display format similar to FIG. 4B.

On the other hand, if the input key is determined to be an update key (←, →, or a to z, etc.) of the change selection menu of the key switch in step S9, step S11 follows and the key switch change selection menu is displayed and changed in order to display the candidates of the key data by the group number and sequence number corresponding to the program keyboard conversion table 32 stored in the program keyboard conversion table 49. Then, the processing routine is returned to step S7.

If it is determined in step S6 that the input key is not the key switch selection key, step S12 follows and a check is made to see if the input key is a key switch change end key (for instance, a predetermined key in the function keys) of the program keyboard or not. In step S12, if it is decided that the input key is a key switch change end key, the processing routine is returned to step S1.

Figure 4E:
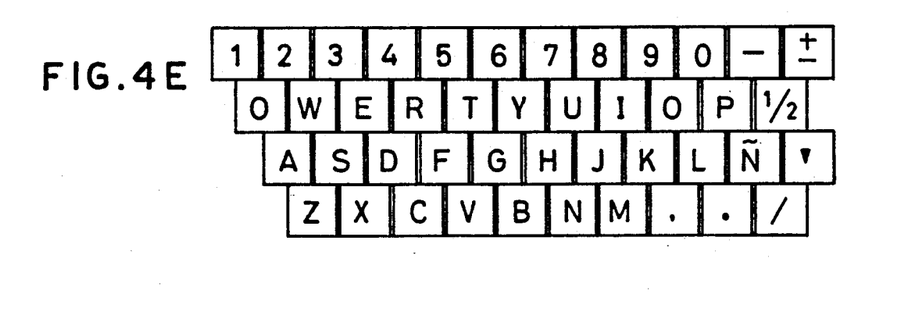

Upon completion of the keyboard programming in FIGS. 4B to 4D, the keyboard is changed to the program keyboard shown in FIG. 4E. As will be obviously understood from the comparison with FIG. 4A, the key input function of ";" is changed to a character "N" with an accent symbol "~". If an enough display area of the display 50 exists, the display formats of FIGS. 4A and 4E can be also displayed to the display 50 in order to show the present key assignment at a proper timing of the above control.

If it is decided in step S12 that the input key is not the key switch change end key, step S13 follows and the line counters 45 and 46 and the key switch arrangement selection menu are updated. Then, the processing routine is returned to step S4.

If it is determined in step S3 that the input key is not the key switch arrangement selection function key of the program keyboard, step S31 in FIG. 3C follows and a check is made to see if the input key is a program kayboard input instruction function key or not. If YES in step S31, step S32 follows and the programmable keyboard input instruction is set or released.

If it is decided in step S32 that the program keyboard mode has been set, step S33 follows and the set state ("1") is set into the table selection flag 48. If it is decided in step S32 that the program keyboard mode has been released, step S34 follows and the release state ("0") is set into the flag 48. Then, the processing routine is retruned to step S1.

On the other hand, if it is determined in step S31 that the input key is not the programmable input instruction fuction key, step S35 follows and the processes of the other function keys are executed. Then, the processing routine is returned to step S1.

If it is decided in step S2 that the input key is not the function key, step S21 in FIG. 3B follows and a check is made to see if the program keyboard mode has been set or not on the basis of the state of the table selection flag 48. If YES in step S21, step S22 follows and upon conversion by the key data 41, the program keyboard conversion table 49 is referred, the program keyboard conversion table 32 is referred by the group number and the sequence number corresponding to the key assignment, and the relevant internal code is stored into a key code area 43.

If NO in step S21, step S23 follows and upon key data conversion, the key switch conversion table 31 is referred and the internal code is stored into the internal key code area 43 in correspondence to the key input data. Then, step S24 follows, the processes to print and display the characters, symbols, or the like which were converted into the internal codes are executed and the processing routine is returned to step S1.

According to the above embodiment, the program keyboard conversion table 49 is provided in the RAM 40 in addition to the table in which the key arrangement and the internal codes which are input are made correspond and which has been stored in the ROM 30. By editing the content (group number and sequence number corresponding to the program keyboard conversion table 32) of the program keyboard conversion table 49, the user can set a desired key arrangement with respect to each key of the keyboard 10. On the other hand, as shown in FIG. 4, the above setting operation can be easily executed by the menu system.

Further, whether the program keyboard control by the program keyboard conversion table 49 is executed or the key arrangement by the key switch conversion table 31 stored in the ROM 30 is used can be easily changed by the key operation. Therefore, the custom-made key arrangement and the standardized key arrangement can be easily switched by the key operation and used.

Therefore, since the user can freely set and change the apparatus by the simple operation so that he can use a desired key arrangement suitable for him, even if the user moved to operate the apparatus using the present system, he can use his own key arrangement and there is no need to spend the vain time to become familiar to the new key arrangement as in the conventional system.

In the above construction, even the number of keys is small, many character types can be made correspond to the keyboard, so that the above construction is suitable for an apparatus in which the keyboard area is limited such as a lap-top type small electronic typewriter or the like.

Although the above embodiment has been described with respect to only a change regarding one key switch of the keyboard, it will be obviously understood that all of the key switches on the keyboard can be changed by the above operation.

The above construction can be commonly embodied to an apparatus having a keyboard which handles various characters such as electronic typewriter, word processor, or the like.

As will be obviously understood from the above description, according to the invention, there is provided a data input apparatus having a keyboard comprising a plurality of character keys, wherein a first control table in which an internal code train which is input by depressing a key is made correspond with respect to each key of the keboard is stored in an unrewritable memory, and a predetermined key arrangement is given to the keyboard by selecting the table, the apparatus has a second control table which has another logic structure different from the first control table and has been set in a rewritable memory and a third control table in which each key of the keyboard in the second control table and the internal code train which is input by the depression of the key are made correspond, the apparatus has means for editing the data of the second control table which was made correspond to the internal code train of the third control table and means for selecting so as to use either the first or second cotrol table for the key input data conversion, the data in the second control table is set and changed by the editing means, and the key arrangement of the keyboard is set and changed for each key. When the second control table is selected by the selecting means, another key arrangement different from the key arrangement selected by the first control table is used. When the first control table is selected by the selecting means, the key arrangement stored in the first control table selected is fixedly used. That is, in addition to the first control table in which the internal code train which is input by the depression of the key is made correspond with respect to each key of the keyboard and which has been provided in the unrewritable memory, the second control table having another structure different from the first control table is provided in the rewritable memory. By changing the content of the second control table, the key arrangement of the keyboard can be set and changed to a desired key arrangement. On the other hand, by selecting either one of the first and second control tables, the custom-made key arrangement and the standardized key arrangement can be easily selected, and the user can easily use a desired key arrangement. Or, even in a limited physical keyboard structure, a variety of more number of key arrangements can be realized and the like. As mentioned above, there are excellent advantages

What is claimed is:

1. A data input apparatus comprising:
   keyboard means having a plurality of character keys;
   memory means in which there are stored
   (i) a first control table containing a first key arrangement having an internal code train for each of the character keys of said keyboard means that are input by depressing a corresponding key,
   (ii) a second control table containing a second key arrangement with a logic structure different from the first control table and stored in a rewritable memory, and
   (iii) a third control table in which each of the keys of the keyboard means in the second key arrangement contained in the second control table are assigned to correspond to the internal code train input by the depression of the corresponding key;
   means for editing the second key arrangement contained in the second control table so as to correspond to the internal code trail of the third control table in said memory means;
   means for selecting either one of the first and second control tables in the memory means for performing key input data conversion;
   determining means for giving a predetermined key arrangement to the keyboard means by storing and editing the key arrangement of the keyboard means for every key using the editing means, such that if the first control table is selected by the selecting means, the first key arrangement stored in the first control table is given to the keyboard means, and if the second control table is selected by the selecting means, the second key arrangement is given to the keyboard means; and display means for designating using a cursor a key to be changed on one line of the key arrangement given by the determining means, displaying a list of a plurality of alternative key information for the key designated by the cursor, and displaying the one line of the key arrangement with the key designated by the cursor being replaced by one of the plurality of alternative key information from the list.

2. An apparatus according to claim 1, wherein the first and third control tables are stored in unrewritable memory means, and the editing means writes into rewritable memory means.

3. A data input apparatus comprising:

keyboard means having a plurality of character keys;

first memory means for storing a plurality of different control tables containing internal code trains that are input by depressing a corresponding key on the keyboard means;

second memory means for storing data from one of said plurality of control tables stored in the first memory means;

editing means for editing the data in the second memory means using the data in said plurality of control tables stored in the first memory means; and selecting means for selecting either (1) data in said plurality of control table stored in the first memory means or (2) the data in the second memory means which was stored and edited by the editing means, so as to set a key arrangement of the keyboard means to either a standardized key arrangement or a custom-made key arrangement, respectively; and display means for designating using a cursor a key to be changed on one line of the key arrangement set by the selecting means, displaying a list of a plurality of alternative key information of the key designated by the cursor, and displaying the one line of the key arrangement with the key designated by the cursor being replaced by one of the plurality of alternative key information from the list.

4. An apparatus according to claim 3, wherein said first memory means comprises an unrewritable memory and the second memory means comprises a rewritable memory.

5. An apparatus according to claim 4, wherein said editing means writes into the second memory means.

6. An apparatus according to claim 3, wherein said editing means writes into the second memory means.

7. A data input apparatus comprising:

first memory means for storing a plurality of different control tables containing internal code trains that are input by depressing a corresponding key on a keyboard;

second memory means or storing data from one of said plurality of control tables stored in the first memory means;

editing means for editing the data in the second memory means using the data in said plurality of control tables stored in the first memory means;

selecting means for selecting either (1) data in said plurality of control tables stored in the first memory means or (2) the data in the second memory means which was stored and edited by the editing means, so as to set a key arrangement of the keyboard; and display means for displaying the key arrangement of the keyboard selected by the selecting means, designating a key to be changed on one line of the selected key arrangement using a cursor, displaying a list of a plurality of alternative key information for the key designated by the cursor, and displaying the one line of the key arrangement with the key designated by the cursor being replaced by one of the plurality of alternative key information from the list.

8. An apparatus according to claim 7, wherein said first memory means comprises an unrewritable memory and said second memory means comprises a rewritable memory.

9. An apparatus according to claim 8, wherein said editing means writes into the second memory means.

10. An apparatus according to claim 7, wherein said editing means writes into the second memory means.

11. A data input apparatus comprising:

keyboard means having a plurality of character keys;

first memory means for storing a plurality of different control tables containing internal code trains that are input by depressing a corresponding key on the keyboard means;

second memory means for storing data from one of said plurality of control tables stored in the first memory means;

editing means for editing the data in the second memory means using the data in said plurality of control tables stored in the first memory means;

selecting means for selecting either (1) data in said plurality of control tables stored in the first memory means or (2) the data in the second memory means which was stored and edited by the editing means, so as to set a key arrangement of the keyboard means; and displaying means for displaying the key arrangement of the keyboard means selected by the selecting means, designating a key to be changed on one line of the selected key arrangement using a cursor, displaying a list of a plurality of alternative key information for the key designated by the cursor, and displaying the one line of the key arrangement with the key designated by the cursor being replaced by one of the plurality of alternative key information from the list.

12. An apparatus according to claim 11, wherein said first memory means comprises an unrewritable memory and said second memory means comprises a rewritable memory.

13. An apparatus according to claim 12, wherein the editing means writes into the second memory means.

14. An apparatus according to claim 11, wherein the editing means writes into the second memory means.

* * * * *

UNITED STATES PATENT AND TRADEMARK OFFICE
CERTIFICATE OF CORRECTION

PATENT NO. : 5,109,355
DATED : April 28, 1992
INVENTOR(S) : TATSUHIKO YUNO

Page 1 of 2

It is certified that error appears in the above-identified patent and that said Letters Patent is hereby corrected as shown below:

COLUMN 1

Line 43, "extent" should read --extent.--.
    Line 55, "apparatus" should read --apparatus.--.

COLUMN 5

Line 62, "keyboard 10" should read --keyboard 10.--.

COLUMN 7

Line 20, "made" should read --made to--.
    Line 64, "made" should read --made to--.
    Line 65, "keboard" should read --keyboard--.

COLUMN 8

Line 5, "made" should read --made to--.
    Line 7, "made" should read --made to--.
    Line 36, "advantages" should read --advantages.--.
    Line 56, "trail" should read --train--.

UNITED STATES PATENT AND TRADEMARK OFFICE
CERTIFICATE OF CORRECTION

PATENT NO.   :  5,109,355
DATED        :  April 28, 1992
INVENTOR(S)  :  TATSUHIKO YUNO It is certified that error appears in the above-identified patent and that said Letters Patent is hereby corrected as shown below:

<u>COLUMN 9</u>

Line 29, "table" should read --tables--.
    Line 56, "or" should read --for--.

Signed and Sealed this

Seventeenth Day of August, 1993

BRUCE LEHMAN

*Commissioner of Patents and Trademarks*